United States Patent Office 2,831,817
Patented Apr. 22, 1958

2,831,817
3,6-DIISOPROPYL CATECHOL ANTIOXIDANT

George G. Ecke, Ferndale, and Alfred J. Kolka, Birmingham, Mich., assignors to Ethyl Corporation, New York, N. Y., a corporation of Delaware No Drawing. Application August 22, 1956
Serial No. 605,483

2 Claims. (Cl. 252—404)

This invention relates to a novel class of chemical compounds and to compositions of matter containing these compounds as antioxidants.

It has been discovered that a heretofore unknown class of diisopropyl catechols possesses outstanding antioxidant properties in a wide variety of organic materials which are subject to oxidative deterioration.

It is an object of this invention to provide a novel class of chemicals possessing outstanding antioxidant characteristics. Another object is to provide a class of diisopropyl catechols having outstanding antioxidant properties. A further object is to provide novel compositions of matter containing a diisopropyl catechol as an oxidation inhibitor.

The objects of this invention are accomplished by a diisopropyl catechol having at least one isopropyl group ortho to a hydroxyl group and a second isopropyl group in a position other than the four-position. Thus, the novel compounds of this invention have the formula:

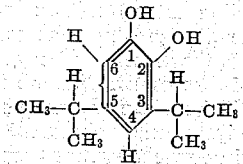

The novel diisopropyl catechols of this invention are effective antioxidants when included in small amounts in organic material tending to deteriorate in the presence of air or oxygen. Thus, such materials as petroleum products, vegetable and animal fats, natural and synthetic rubber and other polymeric organic material are protected by the inclusion of one of the novel diisopropyl catechols of this invention.

The compounds of this invention are crystalline solids which are soluble in liquid hydrocarbons such as benzene, isooctane, gasoline, lubricating oil and the like.

The novel diisopropyl catechols are prepared by the alkylation of catechol with propylene in the presence of aluminum catecholate as a catalyst. The general method of this preparation is described in our prior copending application, Serial No. 426,556, filed April 29, 1954, of which the instant application is a continuation-in-part.

The following example in which all parts are by weight illustrates the preparation and isolation of the compounds of this invention. It should be noted that the aluminum isopropoxide reacts with catechol to form the catalyst aluminum catecholate in the initial stage of the process.

EXAMPLE I

A pressure resistant vessel having a removable cap for charging and discharging liquids and solids, and which was equipped with a plurality of gas inlet and outlet lines, temperature measuring devices, pressure gauges and a mechanical agitator was flushed with nitrogen and charged with 440.4 parts of catechol, 272 parts of toluene and 34 parts of aluminum isopropoxide. The vessel was sealed and pressurized with propylene and heated to 265° C. The temperature was maintained between 265 and 275.5° C. while the pressure varied from 500 to 700 p. s. i. g. over a 3 hour and 40 minute period. The vessel was then cooled and the contents were discharged into a distillation apparatus and the volatile components of the reaction mass were flashed off at reduced pressure leaving 134 parts of residue. The 621.5 parts of volatile components were collected and charged to a 3 foot helix packed column and rectified at reduced pressure.

Three main cuts plus a small amount of recovered catechol and some unidentified ether were retained as products of the rectification. The first main cut consisted of 73.9 parts of 1,2-dihydroxy-3-isopropylbenzene (3-isopropyl catechol). Analysis of this compound showed that it contained 71.3 percent carbon and 7.92 percent hydrogen. Infrared analysis indicated the hydroxyl bond to be resolved into two free hydroxyls with different degrees of hindrance, and further indicated that the substitution type was 1,2,3.

The second main cut of 350.1 parts was identified as 3,6-diisopropyl catechol, boiling at 172 to 173.5° C. at 30 millimeters of mercury. This material was recrystallized from isooctane to give this crystalline product melting at from 74 to 75° C. Analysis of this compound showed that it contained 74.3 percent carbon and 9.34 percent hydrogen. The infrared spectrum was that of a tetra substituted benzene nucleus in which the substituents were on consecutively adjacent carbon atoms.

The third main cut consisted of 106.2 parts of 3,5-diisopropyl catechol, a solid which boiled at 179 to 181° C. at 30 millimeters pressure. When this compound was recrystallized from isooctane a crystalline solid melting at 91.5° C. resulted. Analysis of this compound indicated that it contained 74.0 percent carbon and 9.07 percent hydrogen. The infrared spectrum was that of a tetra substituted benzene nucleus having two free hydroxyls with different degrees of hindrance, in which the substituents were not on adjacent carbon atoms.

The diisopropyl catechols of this invention are excellent antioxidants when dissolved in liquid hydrocarbon fuels containing olefinic organic constituents. In particular, outstanding results are achieved when 3,6-diisopropyl catechol is added to gasoline tending to deteriorate in the presence of air.

To demonstrate the superiority as antioxidants of the novel diisopropyl catechols prepared by the process of this invention comparative tests were conducted using a representative unsaturated hydrocarbon, 2,4,4-trimethylpentene-1, which is found in many cracked gasolines. Each of these novel diisopropyl catechols was tested for antioxidant activity in the hydrocarbon in a concentration of 4 milligrams of antioxidant per 100 milliliters of fuel. For comparative purposes, another portion of the same hydrocarbon containing an identical concentration of 4-methyl-2,6-di-tert-butyl phenol was also tested. The test procedure was the standard method of the American Society for Testing Materials for the determination of the oxidation stability of gasoline (Induction Period Method) ASTM Designation: D–525–46, as fully described in Part III–A, ASTM Standards for 1946. According to this method, the induction period is the period during which there is no drop in pressure indicating no absorption of oxygen, when the test material is placed in a test bomb maintained at a temperature of 100° C. with an initial pressure of 100 pounds per square inch gauge of oxygen. Comparative ratings were established by dividing the induction period of each antioxidant-containing sample by the induction period of a sample of 2,4,4-trimethylpentene-1, which contained no added antioxidant. The results of these tests are summarized in Table I.

Table I
ANTIOXIDANT ACTIVITY OF DIISOPROPYL CATECHOLS

| Antioxidant | Induction Period, Minutes | Rating |
|---|---|---|
| None | 95 | 1.0 |
| 3,6-Diisopropyl Catechol | 1,440+ | 15.5+ |
| 3,5-Diisopropyl Catechol | 1,440+ | 15.5+ |
| 4-Methyl-2,6-di-tert-butyl phenol | 405 | 4.4 |

The above data show that the novel derivatives of catechol are far superior as antioxidants when compared to 4-methyl-2,6-di-tert-butyl phenol, which is a standard, widely used commercial antioxidant. It should be pointed out that in the case of both the 3,5- and 3,6-diisopropyl catechol the tests were discontinued after 1440 minutes, at which time there was no evidence of any decrease in the oxygen pressure. The true ratings for these compounds are, therefore, greater than those indicated in Table I.

The following examples, in which all parts are by weight, are illustrative specific examples of the use of the novel compounds of this invention in organic material normally tending to deteriorate in the presence of air.

EXAMPLE II

To 1000 parts of a liquid hydrocarbon fuel having 39.1 percent paraffins, 21.0 percent olefins, 17.1 percent aromatics and 22.8 percent naphthenes, an initial evaporation temperature of 88° F. and a final evaporation temperature of 426° F. is added 1 part of 3,5-diisopropyl catechol. The mixture is agitated to dissolve the 3,5-diisopropyl catechol in the fuel, and the resulting composition is extremely resistant to oxidative deterioration.

EXAMPLE III

To 1000 parts of a gasoline having 44.0 percent paraffins, 17.9 percent olefins and 38.1 percent aromatics, an initial evaporation temperature of 94° F. and a final evaporation temperature of 119° F. is added 10 parts of 3,6-diisopropyl catechol. The mixture is agitated to dissolve the 3,6-diisopropyl catechol. The resulting fuel has an excellent stability to oxidative deterioration.

EXAMPLE IV

To 5000 parts of a liquid hydrocarbon fuel having 49.7 percent paraffins, 22.3 percent olefins and 28.0 percent aromatics, an initial evaporation temperature of 81° F. and a final evaporation temperature of 410° F. is added 25 parts of an equal molar mixture of 3,5- and 3,6-diisopropyl catechol. The fuel is agitated to dissolve the mixture. The resulting fuel is stable to oxidative deterioration.

EXAMPLE V

To 1000 gallons of the fuel described in Example IV is added 3000 milliliters of tetraethyllead, 0.5 theory bromine as ethylene dibromide, 1.0 theory of chlorine as ethylene dichloride and 9 grams of 3,5-diisopropyl catechol. The mixture is agitated until a homogeneous oxygen stable solution of all the ingredients is achieved.

EXAMPLE V

To 1000 parts of a commercially available diesel fuel having a cetane number of 51.7 and a 50 percent evaporation temperature of 509° F. is added 3 parts of 3,6-diisopropyl catechol. The resulting fuel in stable to oxidative deterioration.

EXAMPLE VII

To 1000 parts of a kerosene-type liquid hydrocarbon fuel having an initial evaporation temperature of 325° F. and a final evaporation temperature of 585° F. is added 6 parts of 3,5-diisopropyl catechol. The mixture is agitated until a homogeneous oxygen stable solution of the ingredients is achieved.

EXAMPLE VIII

To an antiknock fluid composition which is to be used as an additive to gasoline and which contains 61.5 parts of tetraethyllead, 17.9 parts of ethylene dibromide and 18.8 parts of ethylene dichloride is added with agitation 1.3 parts of 3,6-diisopropyl catechol. The resulting composition is stable for long periods when exposed to air.

EXAMPLE IX

The resistance to oxygen of a natural rubber tire-tread formulation having an initially poor resistance to oxidative deterioration and which is composed of 100 parts of smoked sheet, 45 parts of carbon black, 5 parts of zinc oxide, 3 parts of stearic acid, 3 parts of sulfur and 0.65 part of mercapto-benzothiazole is greatly improved by mixing therewith 1 part of 3,5-diisopropyl catechol.

EXAMPLE X

To 1000 parts of polyethylene produced by oxygen catalyzed reaction under a pressure of 20,000 atmospheres and having an average molecular weight of 40,000 is added and mixed 5 parts of 3,5-diisopropyl catechol as an antioxidant.

The above examples illustrate compositions of this invention which possess greatly enhanced resistance to oxidative deterioration by virtue of the presence therein of a diisopropyl catechol of this invention.

The novel diisopropyl catechols find important utility as antioxidants in a wide variety of other oxygen sensitive materials. Thus, the addition of small quantities of this compound to such materials as turbine, hydraulic, transformer and other highly refined industrial oils; waxes; soaps and greases; plastics; organo-metallic compositions such as tetraethyllead and tetraethyllead antiknock fluids; elastomers including natural rubber; crankcase lubricating oils; and the like, greatly increases their resistance to deterioration in the presence of oxygen, air, or ozone.

The compounds of this invention are also very effective antioxidants for high molecular weight hydrocarbon polymers, such as polyethylene, polystyrene, polyisobutylene, polybutadiene, isobutylene-styrene copolymers, methyl rubber, polybutene rubber, natural rubber, butyl rubber, GR–S rubber, GR–N rubber, piperylene rubber, dimethyl butadiene rubber and the like. For this purpose 3,5-diisopropyl catechol is preferred because of its higher melting point.

The diisopropyl catechols of this invention are also useful in protecting petroleum wax—paraffin wax and micro-crystalline wax—against oxidative deterioration. The compounds of this invention also find use in the stabilization of edible fats and oils of animal or vegetable origin which tend to become rancid especially during long periods of storage because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter, fat, lard, beef tallow, and the like.

The following examples illustrate typical edible compositions protected by a diisopropyl catechol of this invention.

EXAMPLE XI

Two parts of 3,6-diisopropyl catechol are blended with 10,000 parts of lard. The resulting protected lard is stable over long storage periods in contradistinction to the unprotected product.

EXAMPLE XII

To 5,000 parts of olive oil is added 1 part 3,5-diisopropyl catechol and the mixture is agitated to produce a homogeneous blend which is stable to oxidative deterioration for a long period.

The amounts of diisopropyl catechol employed are dependent upon the nature of the material to be protected and the conditions to be encountered. Generally speaking, amounts in the order of about 0.001 to about 2 percent by weight of the material to be protected can be used. However, in most instances where the material to be protected does not have an unusual oxidative instability amounts from about 0.01 to about 1 percent are satisfactory.

We claim:
1. 3,6-diisopropyl catechol.
2. As a new composition of matter an organic material normally tending to deteriorate in the presence of air containing as an antioxidant a small amount of the compound of claim 1.

References Cited in the file of this patent
UNITED STATES PATENTS

| | | |
|---|---|---|
| 2,181,102 | Stoesser et al. | Nov. 21, 1939 |
| 2,603,662 | Stevens | July 15, 1952 |

OTHER REFERENCES

English et al.: Jour. Amer. Chem. Soc., vol. 71 (1949), pp. 3310–13 (4 pp.)